US012723147B2

(12) United States Patent
Koike et al.

(10) Patent No.: US 12,723,147 B2
(45) Date of Patent: Sep. 1, 2026

(54) RESIN COMPOSITION, MOLDED PRODUCT, ELECTRONIC COMPONENT, AND ELECTRONIC DEVICE

(71) Applicants: Natsuki Koike, Kanagawa (JP); Mitsuyo Matsumoto, Kanagawa (JP)

(72) Inventors: Natsuki Koike, Kanagawa (JP); Mitsuyo Matsumoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 650 days.

(21) Appl. No.: 18/134,577

(22) Filed: Apr. 14, 2023

(65) Prior Publication Data

US 2023/0331962 A1 Oct. 19, 2023

(30) Foreign Application Priority Data

Apr. 14, 2022 (JP) ................................ 2022-066754
Jan. 27, 2023 (JP) ................................ 2023-010715

(51) Int. Cl.
*C08L 5/00* (2006.01)
*C08K 3/016* (2018.01)
*C08K 3/36* (2006.01)

(52) U.S. Cl.
CPC ................ *C08L 5/00* (2013.01); *C08K 3/016* (2018.01); *C08K 3/36* (2013.01); *C08L 2203/20* (2013.01)

(58) Field of Classification Search
CPC ....... C08L 5/00; C08L 2203/20; C08K 3/016; C08K 3/36
USPC ............................................................ 514/54
See application file for complete search history.

(56) References Cited

U.S. PATENT DOCUMENTS

2015/0038631 A1* 2/2015 Hamaguchi .............. C08K 3/34 524/449
2021/0009799 A1 1/2021 Koike et al.
2021/0395496 A1 12/2021 Matsumoto et al.

FOREIGN PATENT DOCUMENTS

| JP | 2015-183133 | 10/2015 |
|---|---|---|
| JP | 2017-218566 | 12/2017 |
| JP | 2022-003113 | 1/2022 |
| WO | WO2020/013232 A1 | 1/2020 |

OTHER PUBLICATIONS

Gan et al. Synthesis, properties and molecular conformation of paramylon ester derivatives. Polymer Degradation and Stability 145 (2017) 142-149. (Year: 2017).*

* cited by examiner

*Primary Examiner* — Ying-Horng Shiao
(74) *Attorney, Agent, or Firm* — XSENSUS LLP

(57) ABSTRACT

A resin composition contains a resin and talc, wherein the resin contains a β-1,3-glucan derivative resin with the main chain represented by the following Chemical Formula 1, and the talc has an average particle diameter of 10 μm or less, Chemical Formula 1

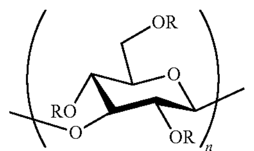

where R's each independently represent hydrogen atoms or alkyl carbonyl groups, at least one of R's is an alkyl carbonyl group, and n represents a natural number.

11 Claims, No Drawings

RESIN COMPOSITION, MOLDED PRODUCT, ELECTRONIC COMPONENT, AND ELECTRONIC DEVICE

CROSS-REFERENCE TO RELATED APPLICATIONS

This patent application is based on and claims priority pursuant to 35 U.S.C. § 119 to Japanese Patent Application Nos. 2022-066754 and 2023-010715, filed on Apr. 14, 2022 and Jan. 27, 2023, respectively, in the Japan Patent Office, the entire disclosures of which are hereby incorporated by reference herein.

BACKGROUND

Technical Field

The present disclosure is related to a resin composition, a molded product, an electronic component, and an electronic device.

Description of the Related Art

Biobased polymers synthesized from a recyclable resource have been recently appealing. Paramylon produced through photosynthesis by microalgae, such as *euglena*, and cardlan bacteria produces in a culture medium through fermentation are polysaccharides with a straight chain of β-1,3-glucan. According to a known research, new fiber can be obtained by synthesizing a paramylon ester derivative chemically modified by introducing an ester group as an application of plastic.

A classical β-1,3-glucan derivative resin involves a problem of being unable to strike a balance between toughness and rigidity.

SUMMARY

According to embodiments of the present disclosure, a resin composition is provided which contains a resin and talc, wherein the resin contains a β-1,3-glucan derivative resin with the main chain represented by the following Chemical Formula 1, and the talc has an average particle diameter of 10 μm or less, Chemical Formula 1

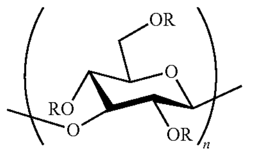

where R's each independently represent hydrogen atoms or alkyl carbonyl groups, at least one of R's is an alkyl carbonyl group, and n represents a natural number.

As another aspect of embodiments of the present disclosure, a molded product is provided which contains the resin composition mentioned above.

As another aspect of embodiments of the present disclosure, an electronic component is provided which contains the molded product mentioned above.
is an improved.

As another aspect of embodiments of the present disclosure, an electronic device is provided which contains the electronic component mentioned above.

DESCRIPTION OF THE EMBODIMENTS

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, a resin composition is provided which can strike a balance between toughness and rigidity.

The present disclosure has the following points about the prescriptions of β-1,3-glucan derivative resin.

In the present disclosure, the talc mixed with β-1,3-glucan derivative resin has an average particle diameter of 10 μm or less.

An average particle diameter of 10 μm or less suitably disperses the talc mixed with a resin composition, producing a resin composition with a good balance between toughness and rigidity.

The points mentioned above are described below.

The resin and additives constituting the resin composition of the present disclosure are described first.

β-Glucan

β-glucan refers to a group of polysaccharides of β-glucose linked with (1→3), (1→4), and (1→6).

Specific examples include, but are not limited to, cellulose, laminaran, lichenan, cereal β-glucan, callose, yeast-cell-wall-derived β-glucan such as zymosan, krestin, Lentinan, dizofiran, glyforan, pachyman, mushroom-derived β-glucan such as β-glucan-derived from *Ganoderma, Agaricus, Hericium erinaceus, Kaempferia*, Kawariharatake, and *Phellinus linteus*, curdlan, and *euglena*-derived paramylon.

β-1,3-Glucan

β-1,3-glucan is a polymer produced by algae and fungi.

β-1,3-glucan is glucose linked with β-1,3 bonding. Cellulose is glucose linked with β-1,4 bonding.

As described above, β-1,3-glucan and cellulose are similar to each other regarding bonding. β-1,3-glucan and cellulose both are not thermoplastic.

However, β-1,3-glucan can have a polymer chain with a triple spiral structure, while cellulose takes a polymer chain with a sheet-like structure. Because of this structural difference, β-1,3-glucan demonstrates unique reaction profiles different from those of cellulose.

Refining β-1,3-glucan is easy in a moderate condition compared to cellulose. Plants cellulose is present firmly bonding with lignin and hemicellulose. Isolating cellulose requires complicated refining in severe conditions, like using a strong acid. Conversely, β-1,3-glucan of algae and fungi is present on its own in most cases. Therefore, refining it is easy, requiring no strong acid. Thus, β-1,3-glucan has monodispersibility and is not readily depolymerized in refining. Isolated β-1,3-glucan mostly maintains monodispersion with a narrow particle distribution, having a long molecular chain peculiar to a natural polymer.

This monodispersibility is characteristic to β-1,3-glucan used as a raw material for a resin. This monodispersibility is maintained through acylation reaction. Therefore, β-1,3-glucan derivatives are free of defects derived from the difference in melting point.

Since β-1,3-glucan can be isolated in high purity compared to cellulose, the β-1,3-glucan derivative thus obtained is likely to have a higher transmission than a cellulose derivative.

β-1,3-glucan may or may not have a side chain. Specific examples of β-1,3-glucan with a side chain include, but are not limited to, Lentinan and dizofiran.

Specific examples of β-1,3-glucan without a side chain include, but are not limited to, cardlan and paramylon.

β-1,3-glucan can be of biological origin or can be synthesized. Biologically-originated β-1,3-glucan is preferable to lessen the load on the environment, and plant-originated β-1,3-glucan is more preferable. Of these, β-1,3-glucan separated from microalgae that synthesize β-1,3-glucan in their cells is preferable to isolate and refine β-1,3-glucan readily.

One of preferable β-1,3-glucan is *Euglena*, or a microalga belonging to Euglenophyta. *Euglena* is readily cultured and has a short propagation cycle. It also accumulates a massive amount of paramylon particles in its cell as a photosynthesis product. Paramylon *euglena* synthesizes or accumulates is β-1,3-glucan formed of 1,500 to 2,000 pieces of liked glucose. β-1,3-glucan, such as paramylon, can be separated from microalgae by a known method.

β-1,3-Glucan Derivative Resin

In β-1,3-glucan derivative resin, hereinafter also referred to as β-1,3-glucan derivative, the hydroxyl groups in glucose constituting the β-1,3-glucan's main chain are partially alkyl-carbonylated with an alkyl carbonyl group. β-1,3-glucan has an alkyl carbonyl group.

Since it has an alkyl carbonyl group, mutual action between molecular chains decreases by disturbance in the arrangement of molecular chains and by reduction of forming of hydrogen bonding between main chains by hydroxyl group. Resultantly, β-1,3-glucan demonstrates attachability and becomes sticky with excellent thermoplasticity.

One of the β-1,3-glucan derivative is a β-1,3-glucan mixture ester represented by the following Chemical Formula 2.

Chemical Formula 2

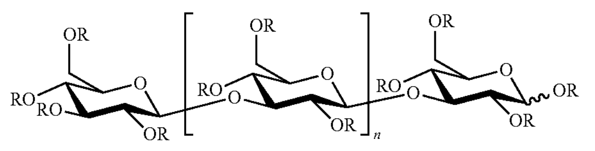

In Chemical Formula 2, R each independently represents hydrogen atoms or alkyl carbonyl groups, at least one of R is an alkyl carbonyl group, and n represents a natural number.

As the alkyl group, straight or branched alkyl groups are preferable and straight chain alkyl groups are more preferable to synthesize easily and have a latitude of freedom of R.

Specific examples of the alkyl group include, but are not limited to, an acetyl group, a propionyl group, an isopropionyl group, a butyryl group, an isobutyryl group, a pentanoyl group, a hexanoyl group, a heptanoyl group, an octanoyl group, a nonanoyl group, a decanoyl group, a lauroyl group, a myristoyl group, a palmitoyl group, and a stearoyl group.

Of these, an acetyl group, a propionyl group, an isopropionyl group, a butyryl group, an isobutyryl group, a pentanoyl group, and a hexanoyl group are more preferable in terms of moldability.

β-1,3-glucan preferably has a weight average molecular weight Mw of from $2.0\times10^3$ to $1.0\times10^6$ and more preferably from $5.0\times10^3$ to $5.0\times10^5$.

β-1,3-glucan preferably has a number average molecular weight Mn of from $2.0\times10^3$ to $1.0\times10^6$ and more preferably from $5.0\times10^3$ to $5.0\times10^5$. A β-1,3-glucan derivative with a molecular weight within the range mentioned above demonstrates moderate attachability and viscosity and can be dissolved well in an organic solvent when used a solvent-based adhesive.

The dispersion degree Mw/Mn of β-1,3-glucan derivative is preferably from 1.0 to 1.6. Within this dispersion degree Mw/Mn, β-1,3-glucan, used as a raw material, maintains monodispersibility well, which results in producing β-1,3-glucan derivative free of concerns about defects derived from the difference between the melting points.

One way of manufacturing a β-1,3-glucan derivative is to synthesize by acylating part or entire of hydroxyl groups in glucose constituting β-1,3-glucan with an aliphatic acid, disclosed in Japanese Patent No. 6029155.

Talc

Talc is hydrated magnesium silicate, $Mg_3Si_4O_{10}(OH)_2$.

Talc is mined in the form of rock and its pulverized powder is added to the resin to increase the rigidity of the resin composition. The talc added can be used alone or in combination.

Talc or a talc mixture obtained by kneading with a part of β-1,3-glucan derivative or another resin can be added when β-1,3-glucan is kneaded.

Talc with an average particle diameter of 10 μm or less dispersed in resin strikes a balance between toughness and rigidity. The aspect ratio of talc in resin is preferably 4 or greater to enhance toughness.

The content of talc is not particularly limited. It is preferably from 1 to 10 parts by mass. In this range, talc is not likely to agglomerate, resulting in good dispersion and preventing toughness degradation.

Although fine powder PAOG-3 and RA-3, manufactured by Nippon Talc Co., Ltd. were used in Examples of the present disclosure, other talc is possibly used.

Flame Retargent

Examples of the flame retardant include, but are not limited to, halogen-based flame retardants, phosphorous-based flame retardants, and hydrated metal-based flame retardants. These can be used alone or in combination.

A flame retardant or a flame retardant mixture obtained by kneading with a part of β-1,3-glucan derivative or another resin can be added when β-1,3-glucan is kneaded.

Although phosphorous-based flame retardant, PX-200, manufactured by DAIHACHI CHAMICAL INDSUTRY CO., LTD. were used in Examples of the present disclosure, other talc is possibly used.

Other Resin and Additive

The resin composition of the present disclosure may optionally contain PP resin, PE resin, PC resin, PS resin, and ABS resin unless these resins significantly degrade flame retardancy and shock absorbency.

The mass ratio in parts by mass of the other resin to the resin composition is preferably from 5:100 to 50:100.

The resin composition of the present disclosure may optionally contain other additives, such as a phosphorous-based stabilizer, phenol-based stabilizer, dye, pigment, and filler unless these additives significantly degrade flame retardancy and shock absorbency.

Molded Product

An example of the mold product of the present disclosure, hereinafter also referred to as a mold product of an example, includes an example of the flame retardant resin composition of the present disclosure.

Specific examples of the molded products of an example include, but are not limited to, members or parts in information mobile devices, such as a computer, laptop computer, tablet device, and smart phone, and in office automation equipment, such as printers and photocopiers. In particular, this product is used as an exterior member requiring heat resistance.

One way of manufacturing the mold product of an example is to utilize injection molding according to a known method.

Electronic Component and Electronic Device

An example of the electronic component of the present disclosure includes the mold product of the present disclosure.

An example of the electronic device of the present disclosure includes the mold product of the present disclosure.

Specific examples of the electronic component include, but are not limited to, electronic components in information/mobile devices, such as a computer, laptop computer, tablet device, and smart phone, and in office automation equipment, such as printers and photocopiers.

Specific examples of the electronic device include, but are not limited to, information mobile devices, such as a computer, laptop computer, tablet device, and smart phone, office automation equipment, such as printers and photocopiers, and home appliances, such as a TV set, refrigerator, and cleaner.

The terms of image forming, recording, and printing in the present disclosure represent the same meaning.

Also, recording media, media, and print substrates in the present disclosure have the same meaning unless otherwise specified.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Hereinafter, the present disclosure is described in more detail based on Examples, but the technical scope of the present disclosure is not limited to thereto.

Raw Material

Each of the components used in manufacturing the resin composition of the present disclosure is described.

Raw Material for Manufacturing Derivative

β-1,3-Glucan: Polysaccharides Derived from *Euglena*

Propionic acid: Cica (Chemicals Industrial products Collect Associate) special grade guaranteed and manufactured by Kanto Chemical Co., Inc.

Butyric acid: Cica (Chemicals Industrial products Collect Associate) special grade guaranteed and manufactured by Kanto Chemical Co., Inc.

Valeric acid: Cica (Chemicals Industrial products Collect Associate) special grade guaranteed and manufactured by Kanto Chemical Co., Inc.

Hexanoic acid: Cica (Chemicals Industrial products Collect Associate) first grade guaranteed and manufactured by Kanto Chemical Co., Inc.

Resin

Polypropylene: NOVATEC™ MA3, manufactured by JAPAN POLYPROPYLENE CORPORATION

Talc

PAOG-3: manufactured by Nippon Talc Co., Ltd

RA-3: manufactured by Nippon Talc Co., Ltd

MS-P: manufactured by Nippon Talc Co., Ltd

Phosphorous-based Flame Retardant

PX-200: aromatic condensed phosphoric acid ester, manufactured by DAIHACHI CHAMICAL INDSUTRY CO., LTD.

Manufacturing Example of Glucan Derivative

Manufacturing of Glucan Derivative 1

Glucan derivative 1 was manufactured through the following 1 to 5.

1. 200 g of β-1,3-glucan shown in Table 1, 8,000 mL of trifluoroacetic anhydride, and 8,000 mL of carboxylic acid were allowed to react at 50 degrees C. for two hours.
2. The resulting substance of the 1 was precipitated with a liquid mixture of methanol and water.
3. The resulting substance of the 2 was rinsed with a liquid mixture of methanol and water.
4. The resulting substance of the 3 was rinsed with ethanol.
5. The resulting substance was treated with vacuum drying for 24 hours to obtain a product, glucan derivative 1.

Manufacturing of Glucan Derivatives 2 to 6

Glucan derivatives 2 to 6 were manufactured in the same manner as in Manufacturing of Glucan Derivative 1 except that β-1,3-glucan and carboxylic acid were changed to those shown in Table 1.

TABLE 1

| | | Derivative No. | | | | | |
|---|---|---|---|---|---|---|---|
| | | 1 | 2 | 3 | 4 | 5 | 6 |
| β-glucan | Paramylon | A | A | A | A | A | |
| | Cardlan | | | | | | A |
| Carboxylic acid | Propionic acid | | A | | | A | |
| | Butyric acid | | | A | | | |
| | Valeric acid | | | | A | | |
| | Hexanoic acid | A | | | | A | A |

Example 1

The compositions in parts by mass shown in Table 2-1 were mixed and kneaded at 185 degrees C. using a compact kneading machine, Mini-Labo, manufactured by Thermo Fischer Scientific Inc., to obtain a resin composition. The resin composition obtained was molded at 200 degrees C. to obtain a piece for evaluation.

Examples 2 to 12 and Comparative Examples 1 and 2

The compositions in parts by mass shown in Tables 2-1 to 2-3 were mixed and kneaded in the same manner as in Example 1 to obtain pieces for evaluation of Examples 1 to 12 and Comparative Examples 1 and 2.

Evaluation

The pieces obtained were measured according to the following test method regarding the average particle diameter and aspect ratio of the talc in the resin composition and Charpy impact strength, bending strength, and bending elastic modulus.

Measuring of Average Particle Diameter and Aspect Ratio of Talc

The average particle diameter and aspect ratio of the talc were measured in the following manner.

The test pieces were cut with Leica's microtome, and was imaged with a scanning electron microscope, Merlin, manufactured by Carl Zeiss AG, with a magnification power of 5,000 and five view fields. The average particle diameter of two-axis average particle diameter and aspect ratio of the entire field talc particles were obtained from the images obtained using an image analyzing particle size distribution measuring software, Mac-View, manufactured by MOUNTECH Co., Ltd.

Major particle diameter and minor particle diameter of individual talc particles were defined as b and a (μm). Then the two-axis average particle diameter, (a+b)/2, of each talc particle was obtained. The average of the entire talc particles was defined as the average particle diameter L (μm).

The aspect ratio A of the talc particle was obtained by averaging the aspect ratio, b/a, of individual talc particles Talc's Average Particle Diameter The average particle diameter L (μm) was evaluated according to the following criteria.

S: $3 \leq L \leq 8$

A: $L < 3$ or $8 < L \leq 10$

C: $10 < L$

Talc's Aspect Ratio

The aspect ratio was evaluated according to the following criteria.

S: $4 \leq A$

A: <4

Measuring of Charpy Impact Strength

The test pieces obtained was subjected to an impact test using a Charpy impact tester according to ISO 179-1 regulation.

The test pieces were notched. The higher the measuring values (kJ/m$^2$), the more excellent the impact resistance.

Evaluation Criteria (kJ/m$^2$)

S: 6 or greater

A: 4 to less than 6

C: Less than 4

Measuring of Bending Strength and Bending Elastic Modulus

The test pieces were subjected to bending test according to ISO 178 regulation to measure the bending strength and bending elastic modulus.

The higher the measuring values (MPa), the more excellent the rigidity.

Bending Strength

Evaluation Criteria (MPa)

S: 45 or greater

A: 40 to less than 45

C: Less than 40

Bending Elastic Modulus

Evaluation Criteria (MPa)

S: 1600 or greater

A: 1500 to less than 1600

C: Less than 1500

TABLE 2-1

| | | Example No. | | | | | |
|---|---|---|---|---|---|---|---|
| | | 1 | | 2 | | 3 | |
| | | Glucan derivative No. | | | | | |
| | | 1 | | 1 | | 1 | |
| | | Ratio | Parts | Ratio | Parts | Ratio | Parts |
| Resin | Glucan derivative Polypropylene | 99.01 | 100 | 95.2 | 100 | 90.9 | 100 |
| Talc | PAOG-3 | 0.99 | 1 | 4.76 | 5 | 9.09 | 10 |
| | RA-3 | 0 | 0 | 0 | 0 | 0 | 0 |
| | MS-P | 0 | 0 | 0 | 0 | 0 | 0 |
| Flame retargent | PX200 | 0 | 0 | 0 | 0 | 0 | 0 |
| Evaluation | Talc's average particle diameter (μm) | 3.1 (S) | | 6.0 (S) | | 10.0 (A) | |
| | Talc's aspect ratio | 6.0 (S) | | 6.0 (S) | | 4.0 (S) | |
| | Charpy impact strength (KJ/m$^2$) | S | | A | | A | |
| | Bending strength (MPa) | A | | S | | S | |
| | Bending elastic modulus (MPa) | A | | S | | S | |
| | | Example No. | | | | | |
| | | 4 | | 5 | | 6 | |
| | | Glucan derivative No. | | | | | |
| | | 2 | | 3 | | 4 | |
| | | Ratio | Parts | Ratio | Parts | Ratio | Parts |
| Resin | Glucan derivative Polypropylene | 95.2 | 100 | 95.2 | 100 | 95.2 | 100 |
| Talc | PAOG-3 | 0 | 0 | 0 | 0 | 0 | 0 |
| | RA-3 | 4.76 | 5 | 4.76 | 5 | 4.76 | 5 |
| | MS-P | 0 | 0 | 0 | 0 | 0 | 0 |
| Flame retargent | PX200 | 0 | 0 | 0 | 0 | 0 | 0 |
| Evaluation | Talc's average particle diameter (μm) | 8.5 (A) | | 9.0 (A) | | 9.8 (A) | |
| | Talc's aspect ratio | 3.0 (A) | | 3.0 (A) | | 3.0 (A) | |
| | Charpy impact strength (KJ/m$^2$) | A | | A | | A | |
| | Bending strength (MPa) | A | | A | | A | |

TABLE 2-1-continued

| | | | | |
|---|---|---|---|---|
| | Bending elastic modulus (MPa) | A | A | A |

TABLE 2-2

| | | Example No. | | | | | |
|---|---|---|---|---|---|---|---|
| | | 7 | | 8 | | 9 | |
| | | Glucan derivative No. | | | | | |
| | | 5 | | 5 | | 1 | |
| | | Ratio | Parts | Ratio | Parts | Ratio | Parts |
| Resin | Glucan derivative | 95.2 | 100 | 95.2 | 100 | 95.2 | 100 |
| | Polypropylene | | | | | | |
| Talc | PAOG-3 | 4.76 | 5 | 0 | 0 | 2.38 | 2.5 |
| | RA-3 | 0 | 0 | 4.76 | 5 | 2.38 | 2.5 |
| | MS-P | 0 | 0 | 0 | 0 | 0 | 0 |
| Flame retargent | PX200 | 0 | 0 | 0 | 0 | 0 | 0 |
| Evaluation | Talc's average particle diameter (μm) | 5.5 (S) | | 8.5 (A) | | 2.5 (A) | |
| | Talc's aspect ratio | 7.0 (S) | | 3.0 (A) | | 2.5 (A) | |
| | Charpy impact strength (KJ/m$^2$) | S | | A | | A | |
| | Bending strength (MPa) | S | | S | | S | |
| | Bending elastic modulus (MPa) | S | | S | | S | |

| | | Example No. | | | | | |
|---|---|---|---|---|---|---|---|
| | | 10 | | 11 | | 12 | |
| | | Glucan derivative No. | | | | | |
| | | 1 | | 6 | | 1 | |
| | | Ratio | Parts | Ratio | Parts | Ratio | Parts |
| Resin | Glucan derivative | 87 | 100 | 95.2 | 100 | 76.2 | 80 |
| | Polypropylene | | | | | 19 | 20 |
| Talc | PAOG-3 | 4.35 | 5 | 4.76 | 5 | 4.76 | 5 |
| | RA-3 | 0 | 0 | | | | |
| | MS-P | 0 | 0 | 0 | 0 | 0 | 0 |
| Flame retargent | PX200 | 8.7 | 10 | 0 | 0 | 0 | 0 |
| Evaluation | Talc's average particle diameter (μm) | 4.0 (S) | | 7.0 (S) | | 8.0 (S) | |
| | Talc's aspect ratio | 6.0 (S) | | 6.0 (S) | | 5.5 (S) | |
| | Charpy impact strength (KJ/m$^2$) | A | | A | | A | |
| | Bending strength (MPa) | A | | S | | A | |
| | Bending elastic modulus (MPa) | A | | S | | A | |

TABLE 2-3

| | | Comparative Example No. | | | |
|---|---|---|---|---|---|
| | | 1 | | 2 | |
| | | Glucan derivative No. | | | |
| | | 1 | | 1 | |
| | | Ratio | Parts | Ratio | Parts |
| Resin | Glucan derivative | 100 | 100 | 90.9 | 100 |
| | Polypropylene | | | | |
| Talc | PAOG-3 | 0 | 0 | 0 | 0 |
| | RA-3 | 0 | 0 | 0 | 0 |
| | MS-P | 0 | 0 | 9.09 | 10 |
| Flame retargent | PX200 | 0 | 0 | 0 | 0 |
| Evaluation | Talc's average particle diameter (μm) | — | | 11.0 (C) | |
| | Talc's aspect ratio | — | | 2.0 (A) | |
| | Charpy impact strength (KJ/m$^2$) | S | | C | |
| | Bending strength (MPa) | C | | A | |
| | Bending elastic modulus (MPa) | C | | A | |

The aspects of the present disclosure are, for example, as follows:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A resin composition comprising:

a resin; and talc, wherein the resin comprises a β-1,3-glucan derivative resin with a main chain of the following Chemical Formula 1, and the talc has an average particle diameter of 10 μm or less, (Chemical Formula 1)

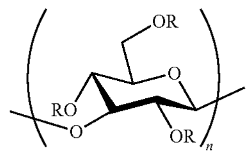

wherein R is each independently a hydrogen atom or an alkyl carbonyl group, at least one R is an alkyl carbonyl group, and n is a natural number, and wherein the talc has an aspect ratio of 2.5 to 7.

2. The resin composition according to claim 1, wherein a mass ratio in parts by mass of the talc to the β-1,3-glucan derivative resin in the resin composition is at 1:100 to 10:100.

3. The resin composition according to claim 1, wherein the talc has an aspect ratio of 4 to 7.

4. The resin composition according to claim 1, wherein the alkyl carbonyl group in the Chemical Formula 1 is one of an acetyl group, a propionyl group, an isopropionyl group, a butyryl group, an isobutyryl group, a pentanoyl group, and a hexanoyl group.

5. The resin composition according to claim 1, further comprising a flame retardant.

6. A molded product comprising:

the resin composition of claim 1.

7. An electronic component comprising:

the molded product of claim 6.

8. An electronic device comprising:

the electronic component of claim 7.

9. The resin composition according to claim 1, further comprising at least one of a polypropylene resin, a polyethylene resin, a polycarbonate resin, a polystyrene resin, and an acrylonitrile butadiene styrene resin.

10. The resin composition according to claim 1, wherein a content of the talc is 1 to 5 parts by mass relative to 100 parts by mass of the β-1,3-glucan derivative resin.

11. The resin composition according to claim 1, further comprising a phosphoric acid ester.

* * * * *